Figures 1, 1A:
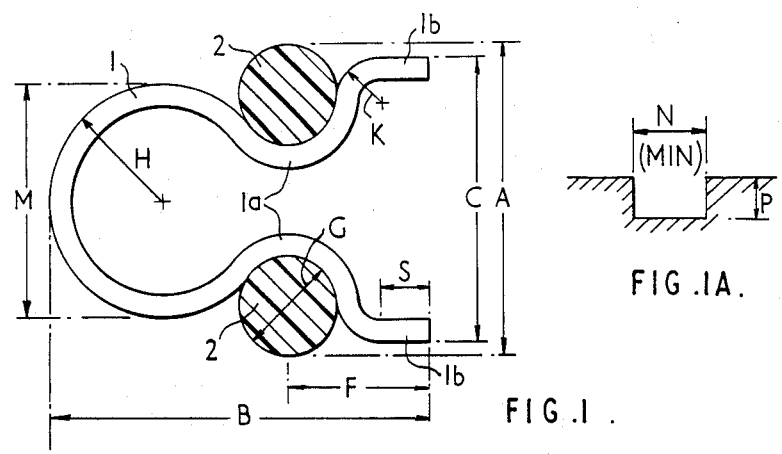

United States Patent [19]

Nicholson

[11] Patent Number: 4,832,353
[45] Date of Patent: May 23, 1989

[54] RING SEALS

[75] Inventor: Terence P. Nicholson, Derwentside, Great Britain

[73] Assignee: 501 Specialist Sealing Limited, St. Helier, Channel Islands

[21] Appl. No.: 211,558

[22] Filed: Jun. 27, 1988

[51] Int. Cl.⁴ .............................................. F16J 15/12
[52] U.S. Cl. .................................. 277/205; 277/165; 277/236
[58] Field of Search ........... 277/165, 200, 205, 206 R, 277/212 R, 212 C, 236

[56] References Cited

U.S. PATENT DOCUMENTS

| 1,892,618 | 12/1932 | Hubbard | 277/236 X |
| 2,631,908 | 3/1953 | Teetor | 277/200 |
| 4,089,535 | 5/1978 | Sattinger | 277/236 |
| 4,319,758 | 3/1982 | Nicholson | 277/236 X |
| 4,508,356 | 4/1985 | Janian | 277/205 |

FOREIGN PATENT DOCUMENTS

| 49345 | 10/1889 | Fed. Rep. of Germany ... 277/206 R |
| 614140 | 6/1935 | Fed. Rep. of Germany ... 277/206 R |
| 840220 | 7/1960 | United Kingdom . |

Primary Examiner—Robert S. Ward
Attorney, Agent, or Firm—Waldron & Associates

[57] ABSTRACT

A heat safe ring seal comprises a metallic hollow ring (1) of uniform material thickness and radially inwardly facing channel-shaped radial profile. The walls of the channel adjacent their free ends are curved towards each other so as to form axially outwardly facing grooves (1a) which each accommodate and shield a concentric ring (2) of PTFE or elastomeric material.

5 Claims, 1 Drawing Sheet

RING SEALS

This invention relates to ring seals intended to be interposed between parallel opposite metal surfaces for sealing the joint therebetween.

A known form of dynamic ring seal for this purpose is intended to be located in a groove or recess formed in the metal body which provides one of the aforesaid metal surfaces and comprises a tubular ring or core of metallic material which is surrounded by an outer ring of substantially U-shaped radial cross-section made of elastomeric material. The open face of the outer ring faces radially inwards and the outside surfaces of the sides of the outer ring are compressed between the opposed metal surfaces which have to be sealed, whilst the outer ring is exposed to internal pressure.

A ring seal constructed as above described, performs extremely well but unfortunately it does not withstand extremely high temperature conditions and is not therefore regarded as being fire-safe. The object of the present invention is to provide a fire-safe ring seal which can safely be used as an alternative to the above-described ring seal in appropriate situations.

In accordance with the present invention there is proposed a ring seal comprising a metallic hollow ring of uniform material thickness and radially inwardly facing channel shaped radial profile, the walls of such channel, adjacent their free ends, being curved towards each other so as to form outwardly facing grooves which each accommodate and shield a concentric ring of PTFE or elastomeric material.

In radial cross-section, the metallic sealing ring may for instance have a profile which is almost circular with divergent straight wall terminations resembling one which is disclosed in British patent specification No. 1,213,454. Alternatively however, and preferably, the profile may be of somewhat omega ($\Omega$) shape, parabolic shape, or ellipsoidal shape with in each instance either straight terminations which are in parallel diametric planes or terminations which lie on a common imaginary cylindrical surface.

Figures 2, 2A:
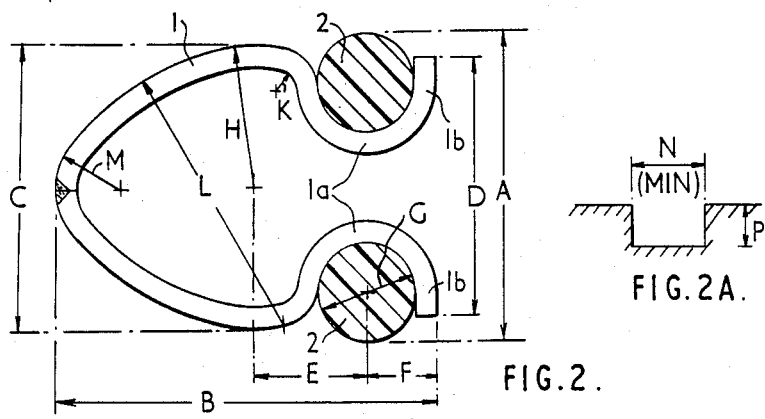
Figures 3, 3A:
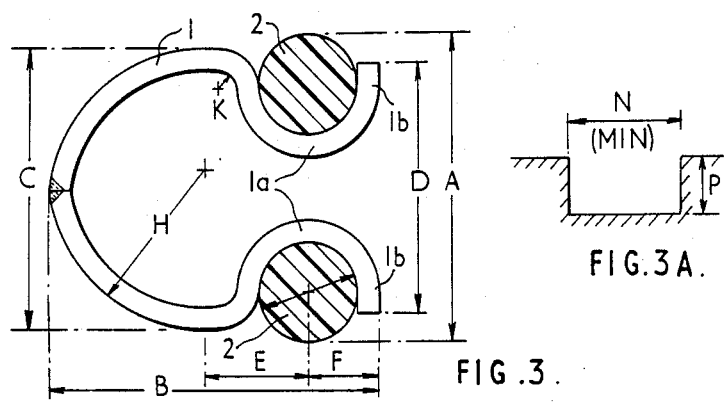

Three typical embodiments of the invention are hereinafter described by reference to the accompanying drawings in which FIGS. 1, 2 and 3 are radial cross-sectional views with FIGS. 1A, 2A and 3A to a reduced scale showing related ring assembly housing details.

In each of FIGS. 1, 2 and 3, the ring assembly therein shown is comprised of a metallic sealing ring 1 and two PTFE or elastomeric material sealing rings 2 which are located in grooves 1a formed by convergent parts of the metallic sealing ring 1.

The metal ring 1 shown in FIG. 1 is of capital omega ($\Omega$) radial profile and is essentially the same as that disclosed in British Pat. No. 2038961 for fitting with suitable clearance in a recess as illustrated in FIG. 1A and it should be noted that in radial profile the radially inward end parts 1b of the ring are straight and parallel.

Typical relative dimensions marked in FIGS. 1 and 1A are set forth in Table 1 below:

TABLE 1

| Seal Section mm | Material Thickness mm | A | B | C | F | G | H | K | M | S | Groove Details N | P |
|---|---|---|---|---|---|---|---|---|---|---|---|---|
| 4.75 | .381 | 5.48 | 6.86 | 4.95 | 2.54 | 1.78 | 2.06 | 0.76 | 4.11 | 0.89 | 8.05 | 4.75 ± .02 |
| 6.35 | .635 | 7.00 | 9.30 | 6.30 | 4.01 | 2.03 | 2.62 | 1.27 | 2.53 | 1.78 | 11.25 | 6.10 ± .02 |
| 9.53 | .965 | 10.44 | 14.22 | 9.73 | 6.17 | 3.10 | 3.94 | 1.93 | 7.87 | 2.79 | 15.80 | 9.52 ± .02 |
|  | 1.422 |  |  |  | 6.76 | 2.64 |  | 2.84 |  | 3.10 |  |  |

The second embodiment of the invention, which is illustrated in FIG. 2, differs from the first one in that the metallic ring 1 is of modified parabolic radial profile somewhat as disclosed in co-pending British patent application No. 860304 with the two halves of the radially outward part of the ring 1 each being of varying radius and its radially innermost parts 1b contained by a common imaginary cylindrical surface.

Typical relative dimensions of these FIG. 2 ring seals, and recesses as shown in FIG. 2A, are set forth in Table 2 below:

TABLE 2

| Seal Section mm | Material Thickness mm | A | B | C | D | E | F | G | H | K | L | M | Groove Details N | P |
|---|---|---|---|---|---|---|---|---|---|---|---|---|---|---|
| 4.75 | .381 | 5.48 | 6.86 | 4.95 | 4.47 | 2.06 | 1.27 | 1.78 | 2.46 | 0.761 | 4.95 | 1.17 | 8.05 | 4.75 ± .02 |
| 6.35 | .635 | 7.00 | 9.30 | 6.30 | 5.66 | 2.49 | 1.65 | 2.03 | 3.15 | 1.27 | 6.30 | 1.65 | 11.20 | 6.10 ± .02 |
| 9.53 | .965 | 10.44 | 14.22 | 9.73 | 8.51 | 3.84 | 2.51 | 3.10 | 4.72 | 1.93 | 9.45 | 2.54 | 15.80 | 9.52 ± .02 |
|  | 1.422 |  |  |  |  | 3.61 | 2.74 | 2.64 |  | 2.84 |  |  |  |  |

The third embodiment of the ring seal, which is illustrated in FIG. 3, is similar to that which has been described with reference to FIG. 2 except that each half of the radially outward part of the metallic ring 1 is of constant radius. As with the FIG. 2 embodiment the radially innermost parts 1b of the metallic ring are contained by a common imaginary cylindrical surface.

Typical relative dimensions of these FIG. 3 ring seals and their recesses as shown in FIG. 3A are set forth in Table 3 below:

TABLE 3

| Seal Section | Material Thickness | A | B | C | D | E | F | G | H | K | Groove Details N | P |
|---|---|---|---|---|---|---|---|---|---|---|---|---|
| 4.75 mm | 0.3 | 5.48 | 5.91 | 4.95 | 4.47 | 2.06 | 1.27 | 1.78 | 2.84 | 0.76 | 7.14 | 4.75 ± 0.02 |
| 6.35 | 0.64 | 7.00 | 7.51 | 6.30 | 5.66 | 2.49 | 1.65 | 2.03 | 3.43 | 1.27 | 9.53 | 6.10 ± 0.02 |
| 9.53 | 0.97 | 10.44 | 11.18 | 9.73 | 3.51 | 3.84 | 2.51 | 3.10 | 5.36 | 1.93 | 13.26 | 9.52 ± 0.02 |

TABLE 3-continued

| Seal Section | Material Thickness | A | B | C | D | E | F | G | H | K | Groove Details N | P |
|---|---|---|---|---|---|---|---|---|---|---|---|---|
| | 1.42 | | | | | 3.61 | 2.74 | 2.64 | 5.36 | 2.84 | | |

It is characteristic of the invention that in all of the embodiments described a perfect gas-tight and fire safe seal is achieved by both axial faces of the ring seal engaging the opposed surfaces which are to be sealed.

In operation the ring 2 made of PTFE or elastomer compresses sufficiently to form an absolutely gas-tight seal whilst being shielded by the parts 1a and 1b of the metallic ring. At the same time the outwardly convex surfaces of the metallic ring 1 come to rest very firmly against the mating faces, thereby guaranteeing a completely fire safe seal.

I claim:

1. A ring seal comprising a metallic hollow ring of uniform material thickness and radially inwardly facing channel-shaped radial profile, the walls of such channel adjacent their free ends being curved towards each other so as to form axially outwardly facing grooves which each accommodate and shield a concentric ring of PTFE or elastomeric material.

2. A ring seal according to claim 1 in which the channel is of capital omega ($\Omega$) shaped radial profile.

3. A ring seal according to claim 1 in which the channel is of ellipsoidal or parabolic radial profile.

4. A ring seal according to claim 2 in which the radially inward end parts of the metallic ring are straight and parallel.

5. A ring seal according to claim 3 in which the radially innermost parts of the metallic ring are contained by a common imaginary cylindrical surface.

* * * * *